United States Patent
Hessing et al.

(10) Patent No.: US 10,464,058 B2
(45) Date of Patent: Nov. 5, 2019

(54) ION EXCHANGE MEMBRANES

(71) Applicant: Fujifilm Manufacturing Europe B.V., Tilburg (NL)

(72) Inventors: Jacko Hessing, Tilburg (NL); Morihito Ikeda, Tilburg (NL)

(73) Assignee: Fujifilm Manufacturing Europe B.V., Tilburg (NL)

( * ) Notice: Subject to any disclaimer, the term of this patent is extended or adjusted under 35 U.S.C. 154(b) by 145 days.

(21) Appl. No.: 15/744,340

(22) PCT Filed: Jul. 1, 2016

(86) PCT No.: PCT/GB2016/051997
§ 371 (c)(1),
(2) Date: Jan. 12, 2018

(87) PCT Pub. No.: WO2017/009603
PCT Pub. Date: Jan. 19, 2017

(65) Prior Publication Data
US 2018/0200708 A1      Jul. 19, 2018

(30) Foreign Application Priority Data

Jul. 14, 2015   (GB) .................................. 1512293.0
Sep. 9, 2015   (GB) .................................. 1515968.4

(51) Int. Cl.
| | | |
|---|---|---|
| *B01J 39/07* | (2017.01) | |
| *C08J 5/22* | (2006.01) | |
| *C08J 7/18* | (2006.01) | |
| *B01D 61/42* | (2006.01) | |
| *B01D 61/48* | (2006.01) | |
| *B01D 69/02* | (2006.01) | |
| *B01D 71/40* | (2006.01) | |
| *B01J 39/20* | (2006.01) | |
| *C08F 220/60* | (2006.01) | |
| *B01D 69/12* | (2006.01) | |

(52) U.S. Cl.
CPC ............ *B01J 39/07* (2017.01); *B01D 61/422* (2013.01); *B01D 61/48* (2013.01); *B01D 69/02* (2013.01); *B01D 69/125* (2013.01); *B01D 71/40* (2013.01); *B01J 39/20* (2013.01); *C08F 220/60* (2013.01); *C08J 5/2231* (2013.01); *C08J 5/2287* (2013.01); *C08J 7/18* (2013.01); *B01D 2325/42* (2013.01); *C08F 2220/606* (2013.01); *C08J 2333/24* (2013.01); *C08J 2333/26* (2013.01); *C08J 2433/08* (2013.01); *C08J 2433/24* (2013.01)

(58) Field of Classification Search
CPC . B01J 39/07; B01J 39/20; C08J 5/2231; C08J 5/2287; C08J 7/18; B01D 61/422; B01D 61/48; B01D 69/02; B01D 69/125; B01D 71/40; C08F 220/60
USPC ......................................................... 521/27
See application file for complete search history.

(56) References Cited

U.S. PATENT DOCUMENTS

| | | | |
|---|---|---|---|
| 3,666,693 A * | 5/1972 | Chapiro ............... | C08F 259/08 428/422 |
| 5,094,732 A | 3/1992 | Oldani et al. | |
| 5,300,204 A | 4/1994 | Sugaya et al. | |
| 5,376,250 A | 12/1994 | Hamano | |
| 5,714,521 A | 2/1998 | Kedem et al. | |
| 9,675,940 B2 | 6/2017 | Van Berchum et al. | |
| 2015/0144557 A1 | 5/2015 | Ly et al. | |
| 2015/0290594 A1* | 10/2015 | Van Berchum .... | B01D 67/0006 210/500.35 |
| 2015/0343391 A1 | 12/2015 | Ly et al. | |
| 2016/0038888 A1 | 2/2016 | Yin et al. | |

FOREIGN PATENT DOCUMENTS

| | | | |
|---|---|---|---|
| WO | 2007018425 A1 | 2/2007 | |
| WO | 2013/011272 A1 | 1/2013 | |
| WO | 2014/165984 A1 | 10/2014 | |
| WO | WO-2014165984 A1 * | 10/2014 | ............. B01J 41/14 |

OTHER PUBLICATIONS

Guler et al., J. of Membrane Science, 455, p. 254-270, 2014 entitled "Monovalent-ion-selective membranes for reverse electrodialysis".
Kawagoe et al, "Solute Permeation through Perfluorocarboxylate Membranes", Die Angewandte Makromolekulare Chemie, 152 (1987), 61-78 (Nr. 2460).
Martin et al, "Zeta Potential of membranes as a function of pH Optimisation of isoelectric point evaluation", Journal of Membrane Science, 213 (2003), 225-230.
S. Mulyati et al, "Simultaneous improvement of the monovalent anion selectivity and antifouling properties of an anion exchange membrane in an electrodialysis process, using polyelectrolyte multilayer deposition", J. of Membrane Science, 431, (2013), 11 3-120.
Thesis by Sri Mulyati entitled "Modeling of Electrodialysis Process and Improvement of Anion Exchange Performance by Surface Modification with Polyelectrolyte", dated Jan. 2013.
Thesis Guler, E. (2014 ). Anion exchange membrane design for reverse electrodialysis Enschede DOI: 10.3990/1.9789036535700.

* cited by examiner

*Primary Examiner* — Michael Bernshteyn
(74) *Attorney, Agent, or Firm* — Banner & Witcoff, Ltd.

(57) ABSTRACT

A composite ion exchange membrane comprising a cationically-charged membrane and an oppositely charged compound covalently bound thereto, the composite ion exchange membrane having: (i) a zeta-potential lower than −8 mV; and (ii) an effective charge lower than 20 μmol/m².

13 Claims, No Drawings

ION EXCHANGE MEMBRANES

RELATED APPLICATIONS

This application is a National Stage Application under 35 U.S.C. 371 of co-pending PCT application PCT/GB2016/051997 designating the United States and filed Jul. 1, 2016; which claims the benefit of GB application number 1515968.4 and filed Sep. 9, 2015 and GB application number 1512293.0 and filed Jul. 14, 2015 each of which are hereby incorporated by reference in their entireties.

This invention relates to ion exchange membranes and to processes for their preparation and use.

Ion exchange membranes are used in electrodialysis, reverse electrodialysis, electrolysis, diffusion dialysis and a number of other processes. Typically the transport of ions through the membranes occurs under the influence of a driving force such as an ion concentration gradient or, alternatively, an electrical potential gradient.

Ion exchange membranes are generally categorized as cation exchange membranes or anion exchange membranes, depending on their predominant charge. Cation exchange membranes comprise negatively charged groups that allow the passage of cations but reject anions, while anion exchange membranes comprise positively charged groups that allow the passage of anions but reject cations.

It is known to surface treat ion exchange membranes with an oppositely-charged species in order to modify their separation properties. For example, WO2014165984 describes the surface treatment of ion exchange membranes with a polymerizable solution comprising (i) a charged ionic monomer having one or more ethylenic groups selected from (meth)acryloxy groups, (meth)acrylamido groups, and vinylbenzyl groups, (ii) a hydrophobic crosslinking monomer having two or more ethylenic groups selected from (meth)acryloxy groups, (meth)acrylamido groups, and vinylbenzyl groups, (iii) a free radical initiator, and (iv) a solvent medium. In Example 3 of WO2014165984, a cation exchange membrane comprising negative charges was surface modified using a composition comprising 4,4'-methylene bis(cyclohexyl acrylamide) crosslinker and positively charged (3-acrylamidopropyl)trimethyl ammonium chloride in a molar ratio of about 0.86.

There is a desire to provide membranes having properties, e.g. good selectivity, particularly for monovalent ions, a high limiting current density (LCD) and low electrical resistance. In particular, ion exchange membranes are desired which can remove nitrate from water even when the nitrate is present in the water at low levels.

According to the present invention there is provided a composite ion exchange membrane comprising a cationically-charged membrane and an oppositely charged compound covalently bound thereto, the composite ion exchange membrane having:
  (i) a zeta-potential lower than −8 mV; and
  (ii) an effective charge lower than 20 µmol/m$^2$.

The composite membranes of the present invention have good selectivity, a high limiting current density (LCD) and low electrical resistance. In particular, the membranes are useful for removing nitrate from water, even when the nitrate is present in the water at low levels.

In this document (including its claims), the verb "comprise" and its conjugations is used in its non-limiting sense to mean that items following the word are included, but items not specifically mentioned are not excluded. In addition, reference to an element by the indefinite article "a" or "an" does not exclude the possibility that more than one of the elements is present, unless the context clearly requires that there be one and only one of the elements. The indefinite article "a" or "an" thus usually mean "at least one".

For brevity in this specification we often refer to cationically-charged membrane used to make the composite membrane as the "untreated membrane". Thus the terms "cationically-charged membrane" and "untreated membrane" are interchangeable.

Typically the untreated membrane from which the composite membrane has been obtained is polymeric, having been obtained by a process comprising the polymerisation of a composition comprising a crosslinking agent and a monofunctional ethylenically unsaturated monomer having a cationic charge. Untreated membranes may be obtained commercially, e.g. from FUJIFILM.

Preferred monofunctional ethylenically unsaturated monomers having a cationic charge comprise a quaternary ammonium group. Examples of such compounds include (3-acrylamidopropyl)trimethylammonium chloride, 3-methacrylamidopropyl trimethyl ammonium chloride, (ar-vinylbenzyl)trimethylammonium chloride, (2-(methacryloyloxy)ethyl)trimethylammonium chloride, [3-(methacryloylamino)propyl]trimethyl ammonium chloride, (2-acrylamido-2-methylpropyl)trimethylammonium chloride, 3-acrylamido-3-methylbutyl trimethyl ammonium chloride, acryloylamino-2-hydroxypropyl trimethyl ammonium chloride, N-(2-aminoethyl)acrylamide trimethyl ammonium chloride and mixtures comprising two or more thereof.

The thickness of the composite membrane and/or the untreated membrane, including the porous support when present, is preferably less than 250 µm, more preferably from 5 to 200 µm, most preferably from 10 to 150 µm, e.g. about 20, about 50, about 75 or about 100 µm.

Preferably the untreated membrane comprises a porous support. As examples of porous supports which may be included in the untreated membrane there may be mentioned woven and non-woven synthetic fabrics and extruded films. Examples include wetlaid and drylaid non-woven material, spunbond and meltblown fabrics and nanofiber webs made from, e.g. polyethylene, polypropylene, polyacrylonitrile, polyvinyl chloride, polyester, polyamide, and copolymers thereof. Porous supports may also be porous membranes, e.g. polysulfone, polyethersulfone, polyphenylenesulfone, polyphenylenesulfide, polyimide, polyethermide, polyamide, polyamideimide, polyacrylonitrile, polycarbonate, polyacrylate, cellulose acetate, polypropylene, poly(4-methyl 1-pentene), polyinylidene fluoride, polytetrafluoroethylene, polyhexafluoropropylene and polychlorotrifluoroethylene membranes.

Preferably the untreated membrane has an ion exchange capacity of at least 0.1 meq/g, more preferably of at least 0.3 meq/g, especially more than 0.6 meq/g, more especially more than 1.0 meq/g, based on the total dry weight of the membrane (including the porous support when present). Ion exchange capacity may be measured by titration as described by Dlugolecki et al, J. of Membrane Science, 319 (2008) on page 217.

Preferably the untreated membrane exhibits a swelling in water of less than 100%, more preferably less than 75%, most preferably less than 60%. The degree of swelling can be controlled by the amount of crosslinking agents, the amount of non-curable compounds and by selecting appropriate parameters in the curing step and further by the properties of the porous support (when present). Electrical resistance, permselectivity and % swelling in water may be measured by the methods described by Dlugolecki et al, J. of Membrane Science, 319 (2008) on pages 217-218.

Typically the untreated membrane is substantially non-porous, e.g. in swollen state impregnatable by small molecules. The membrane preferably has pores all of which are smaller than the detection limit of a standard Scanning Electron Microscope (SEM). Thus using a Jeol JSM-6335F Field Emission SEM (applying an accelerating voltage of 2 kV, working distance 4 mm, aperture 4, sample coated with Pt with a thickness of 1.5 nm, magnification 100,000×, 3° tilted view) the average pore size is generally smaller than 5 nm, preferably smaller than 2 nm, especially smaller than 1 nm.

The resultant composite membrane (which may also be referred to as the "surface-treated membrane") preferably has a low water permeability so that (hydrated) ions may pass through the membrane and (free) water molecules do not easily pass through the membrane.

Preferably the composite membrane has a permselectivity for small cations (e.g. $Na^+$) or anions (e.g. $Cl^-$) above 90%, more preferably above 95%.

Preferably the composite membrane has an electrical resistance less than 15 ohm·$cm^2$, more preferably less than 10 ohm·$cm^2$, most preferably less than 8 ohm·$cm^2$. For certain applications a high electrical resistance may be acceptable especially when the permselectivity is very high, e.g. higher than 95%, and the water permeation low, for example for processes that operate with low conductive streams such as systems used for producing ultrapure water and/or drinking water. The electrical resistance may be determined by the method described below in the examples section.

Preferably the surface-treated membrane's water permeability is lower than $1 \cdot 10^{-9}$ $m^3/m^2 \cdot s \cdot kPa$, more preferably lower than $1 \cdot 10^{-19}$ $m^3/m^2 \cdot s \cdot kPa$, most preferably lower than $5 \cdot 10^{-11}$ $m^3/m^2 \cdot s \cdot kPa$, especially lower than $3 \cdot 10^{-11}$ $m^3/m^2 \cdot s \cdot kPa$.

The composite membranes according to the first aspect of the present invention are preferably obtained by a process comprising reacting a cationically-charged membrane with a composition comprising:
(a) a monofunctional ethylenically unsaturated monomer having an ionic charge opposite to the charge of the cationically-charged membrane; and
(b) a crosslinking agent comprising two or more ethylenically unsaturated groups.

Preferably the molar ratio of (b):(a) is lower than 0.04 or is zero.

By "monofunctional" we mean that component (a) has one and only one ethylenically unsaturated group. By "lower than 0.04 or is zero" it is meant 0 to below 0.04.

The molecular weight (MW) of component (a) of the composition preferably satisfies the equation:

$$MW < (300 + 300n)$$

wherein:
MW is the molecular weight of component (a); and
n has a value of 1, 2, 3 or 4 and is the number of ionic groups present in component (a).

In the above equation, MW is more preferably $<(250+250n)$, even more preferably $<(200+200n)$, especially $<(150+200n)$, wherein MW and n are as hereinbefore defined.

Component (a) preferably comprises an anionic group or a cationic group and one (and only one) ethylenically unsaturated group. Depending on the pH of the composition, the ionic groups may partially or wholly form a salt with a counterion. The curable ionic compound may be rendered curable by the presence of one (i.e. one and only one) ethylenically unsaturated group.

When calculating the MW of component (a) and when calculating the molar ratio of (b):(a) the molecular weight the counterion is assumed to be zero, even when component (a) wholly or partially forms a salt with a counterion.

Preferred monofunctional ethylenically unsaturated monomers having an anionic group comprise an acidic group, for example a sulpho, carboxy and/or phosphato group. Preferably the monofunctional ethylenically unsaturated monomer comprises a sulpho group. Examples of monofunctional ethylenically unsaturated monomers having an anionic group include acrylic acid, beta carboxy ethyl acrylate, maleic acid, maleic acid anhydride, vinyl sulphonic acid, phosphonomethylated acrylamide, (2-carboxyethyl) acrylamide, 2-(meth)acrylamido-2-methylpropanesulfonic acid, mixtures comprising two or more thereof and salts thereof.

Component (a) preferably forms a salt or complex with an oppositely charged counterion. Component (a) preferably forms a salt or complex with an inorganic counter ion (e.g. lithium, sodium, potassium, aluminium, calcium and/or magnesium) or an organic counter ion (e.g. an amine) or a mixture comprising an inorganic counter ion and an organic counter ion. Surprisingly polyvalent counter ions (e.g. counter ions having a $2^+$ or $3^+$ charge) can produce composite membranes having very good selectivity and high limiting current density. Examples of organic polyvalent counter ions include ethylene diamine, 1,3-diaminopropane, 1,6-diaminohexane, triethylene diamine (DABCO), diethylenetriamine, triethylenetetramine, piperazine and phenylenediamine. Examples of inorganic polyvalent counter ions include magnesium and calcium.

The molar ratio of the counter ion to component (a) is preferably from 0.1 to 1.0, especially 0.1 to 0.6.

In one embodiment the untreated membrane comprises a cationic charge and component (a) has an anionic charge. In another embodiment the untreated membrane comprises an anionic charge and component (a) has a cationic charge.

Preferably the composition comprises 8 to 80 wt %, more preferably 10 to 70 wt %, especially 12 to 65 wt %, more especially 14 to 50 wt % of component (a).

When calculating the molar ratio of (b):(a) one must take into account all of the components present in the composition falling within the definition (a) and all of the components present in the composition falling within the definition (b) (if any). For example, if the composition contains two monofunctional ethylenically unsaturated monomers, each having an ionic charge opposite to the charge of the ionically-charged membrane, then the number of moles of component (a) is the total number of moles of the said monomers added together. Similarly, if the composition contains two crosslinking agents, each comprising two or more ethylenically unsaturated groups, then the number of moles of component (b) is the total number of moles of the said crosslinking agents added together.

Thus component (a) may consist of one or more than one monofunctional ethylenically unsaturated monomer having an ionic charge opposite to the charge of the ionically-charged membrane (preferably one monofunctional ethylenically unsaturated monomer having an ionic charge opposite to the charge of the ionically-charged membrane or 2 to 5 monofunctional ethylenically unsaturated monomers, each having an ionic charge opposite to the charge of the ionically-charged membrane).

Similarly component (b) (when present) may consist of one or more than one crosslinking agent comprising two or more ethylenically unsaturated groups (preferably one crosslinking agent comprising two or more ethylenically unsaturated groups or 2 to 5 crosslinking agents, each comprising two or more ethylenically unsaturated groups).

The crosslinking agent(s) preferably each independently have two to six ethylenically unsaturated groups, more preferably two or three, especially two ethylenically unsaturated groups.

The preferred ethylenically unsaturated groups which may be present in component (a) and (b) (when present) are (meth)acrylic groups, more preferably (meth)acrylate or (meth)acrylamide groups, especially acrylic groups, e.g. acrylate or acrylamide groups.

Most preferably component (b) (when present) comprises acrylamide or methacrylamide groups.

Preferably the molecular weight of component (b) satisfies the equation:

($W \times m$)>molecular weight of the crosslinking agent wherein:
  m is the number of ethylenically unsaturated groups present in the crosslinking agent; and
  W is 120, more preferably 105, especially 90, more especially 85 or 77.

The lower values of W mentioned above are preferred because the resultant crosslinking agents crosslink more efficiently than when W is higher. Furthermore, crosslinking agents having the lower values of W mentioned above have lower molecular weights, leaving room for higher amounts of component (a) having ionic groups and thereby achieving a lower electrical resistance for the resultant composite membrane for the same level of crosslinking.

Component (b), when present, is preferably of the Formula (1):

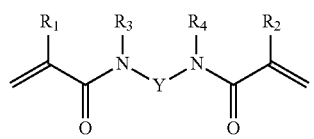

Formula (1)

wherein:
  $R_1$ and $R_2$ are each independently H or methyl;
  $R_3$ and $R_4$ are each independently H, alkyl, $R_3$ and $R_4$ together with the N groups to which they are attached and Y form an optionally substituted 6- or 7-membered ring; and
  Y is an optionally substituted and optionally interrupted alkylene, arylene or arylalkylene group.

When $R_3$ or $R_4$ is alkyl it is preferably $C_{1-4}$-alkyl.

When $R_3$ and $R_4$ together with the N groups to which they are attached and Y form an optionally substituted 6- or 7-membered ring they preferably form a piperazine, homopiperazine or triazine ring.

The optional interruptions which may be present in Y are preferably ether groups or, more preferably, amino groups. Preferably Y is or comprises a group of the formula —$(C_nH_{2n})$— wherein n is 1, 2 or 3.

Examples of crosslinking agents having from two to six acrylamide groups include N,N'-methylene bis(meth) acrylamide, N,N'-ethylene bis(meth)acrylamide, N,N'-propylene bis(meth)acrylamide, N,N'-butylene bis(meth)acrylamide, N,N'-(1,2-dihydroxyethylene)bis-(meth)acrylamide, 1,4-diacryloyl piperazine, 1,4-bis(acryloyl)homopiperazine, triacryloyl-tris(2-aminoethyl)amine, triacroyl diethylene triamine, tetra acryloyl triethylene tetramine, 1,3,5-triacryloyl-hexahydro-1,3,5-triazine and/or 1,3,5-trimethacryloylhexahydro-1,3,5-triazine. The term '(meth)' is an abbreviation meaning that the 'meth' is optional, e.g. N,N'-methylene bis(meth)acrylamide is an abbreviation for N,N'-methylene bis acrylamide and N,N'-methylene bis methacrylamide.

More preferably $R_3$ and $R_4$ are both H and Y is an optionally substituted $C_{1-3}$-alkylene group or an optionally substituted —($C_{1-3}$-alkylene-$NR_5$—$C_{1-3}$-alkylene)-group wherein $R_5$ is H or $C_{1-4}$-alkyl. Especially preferred crosslinking agents which may be used as component (b) are N,N'-methylene bis(meth)acrylamide, N,N'-ethylene bis (meth)acrylamide, N,N'-propylene bis(meth)acrylamide, N,N-(1,2-dihydroxyethylene)bis-(meth)acrylamide, triacryloyl-tris(2-aminoethyl)amine and triacroyl diethylene triamine.

Preferably the molar ratio of (b):(a) is lower than 0.02, more preferably lower than 0.01, especially zero (i.e. the composition is free from crosslinking agents). Preferably the composition comprises 0 to 3 wt % of component (b), more preferably 0 to 1 wt %, especially 0 to 0.1 wt %.

The composition optionally further comprises an inert solvent (c). The optional inert solvent (c) may be any solvent which does not copolymerise with component (a) or (b) (when present) during the process. An inert solvent comprising an inert organic solvent and water is advantageous, especially where some or all of the inert organic solvent is water-miscible. The water is useful for dissolving component (a) and the inert organic solvent is useful for dissolving any other organic components of the curable composition.

The inclusion of an inert solvent can be useful for reducing the viscosity and/or surface tension of the composition, making the manufacturing process easier in some respects.

In one embodiment the inert solvent comprises at least 50 wt % water, more preferably at least 70 wt % water, relative to the total amount of inert solvent. Thus the inert solvent preferably comprises less than 30 wt % inert organic solvent and any remaining inert solvent is water. In one embodiment the composition is free from inert organic solvents, providing environmental advantages due to the complete absence of (volatile) inert organic solvents.

Preferably the composition comprises 20 to 90 wt %, more preferably 30 to 85 wt %, most preferably 35 to 81 wt % of component (c).

Preferred inert organic solvents include $C_{1-4}$ alcohols (e.g. mono ols such as methanol, ethanol and propan-2-ol); diols (e.g. ethylene glycol and propylene glycol); triols (e.g. glycerol)); carbonates (e.g. ethylene carbonate, propylene carbonate, dimethyl carbonate, diethyl carbonate, di-t-butyl dicarbonate and glycerin carbonate); dimethyl formamide; acetone; N-methyl-2-pyrrolidinone; and mixtures comprising two or more of the foregoing. A particularly preferred organic solvent is propan-2-ol.

In one embodiment the inert organic solvent has a low boiling point, e.g. a boiling point below 100° C. Inert solvents having a low boiling point can be easily removed by evaporation, avoiding the need for a washing step for removal of the solvent.

The curable composition may comprise one or more than one solvent as component (c).

In one embodiment the composition is free from free radical initiators. When the composition is free from free radical initiators the composition may be reacted with the cationically-charged membrane by a process comprising irradiating the composition with electron beam radiation.

Preferably the curable composition comprises one or more than one free radical initiator (component (d)).

The reaction is preferably achieved thermally (e.g. by irradiating the composition with infrared light) or, more preferably, by irradiating the composition with ultraviolet light or an electron beam.

For the thermal reaction the composition preferably comprises one or more thermally reactive free radical initiators as component (d). Examples of thermally reactive free radical initiators include organic peroxides, e.g. ethyl peroxide and/or benzyl peroxide; hydroperoxides, e.g. methyl hydroperoxide, acyloins, e.g. benzoin; certain azo compounds, e.g. α,α'-azobisisobutyronitrile and/or γ,γ'-azobis(γ-cyanovaleric acid); persulphates; peracetates, e.g. methyl peracetate and/or tert-butyl peracetate; peroxalates, e.g. dimethyl peroxalate and/or di(tert-butyl) peroxalate; disulfides, e.g. dimethyl thiuram disulfide and ketone peroxides, e.g. methyl ethyl ketone peroxide. Temperatures in the range of from about 30° C. to about 150° C. are generally employed for infrared curing. More often, temperatures in the range of from about 40° C. to about 110° C. are used.

Preferably the composition comprises 0 or 0.01 to 10 wt %, more preferably 0.05 to 5 wt %, especially 0.1 to 2 wt %, of component (d). The preferred free radical initiator is a photoinitiator.

For acrylamides, diacrylamides, and higher-acrylamides, type I photoinitiators are preferred. Examples of type I photoinitiators are as described in WO 2007/018425, page 14, line 23 to page 15, line 26, which are incorporated herein by reference thereto. Especially preferred photoinitiators include alpha-hydroxyalkylphenones, e.g. 2-hydroxy-2-methyl-1-phenyl propan-1-one and 2-hydroxy-2-methyl-1-(4-tert-butyl-)phenylpropan-1-one, and acylphosphine oxides, e.g. 2,4,6-trimethylbenzoyl-diphenylphosphine oxide, and bis(2,4,6-trimethylbenzoyl)-phenylphosphine oxide.

When a free radical initiator is present in the composition, preferably a polymerization inhibitor is also included (e.g. in an amount of below 2 wt %). This is useful to prevent premature curing of the composition during, for example, storage. Suitable inhibitors include hydroquinone, hydroquinone mono methyl ether, 2,6-di-t-butyl-4-methylphenol, 4-t-butyl-catechol, phenothiazine, 4-oxo-2,2,6,6-tetramethyl-1-piperidinoloxy, free radical, 4-hydroxy-2,2,6,6-tetramethyl-1-piperidinoloxy, free radical, 2,6-dinitro-sec-butylphenol, tris(N-nitroso-N-phenylhydroxylamine)aluminum salt, Omnistab™ IN 510 and mixtures comprising two or more thereof.

Where desired, a surfactant or combination of surfactants may be included in the composition, e.g. as a wetting agent or to adjust surface tension. Commercially available surfactants may be utilized, including radiation-curable surfactants. Surfactants suitable for use in the composition include non-ionic surfactants, ionic surfactants, amphoteric surfactants and combinations thereof.

Preferred surfactants are as described in WO 2007/018425, page 20, line 15 to page 22, line 6, which are incorporated herein by reference thereto. Fluorosurfactants are particularly preferred, especially Zonyl® FSN and Capstone® fluorosurfactants (produced by E.I. Du Pont). Also preferred are polysiloxane based surfactants, especially Surfynol from Air Products, Xiameter surfactants from Dow-Corning, TegoPren and TegoGlide surfactants from Evonik, Siltech and Silsurf from Siltech, and Maxx organosilicone surfactant from Sumitomo Chemical.

The cationically-charged membrane may be reacted with the composition by a process comprising irradiating and/or heating the composition while the composition is in contact with the cationically-charged membrane.

During the reaction, the composition may form a layer on top of the cationically-charged membrane or it may permeate partially into the pores of the cationically-charged membrane. The composition may be applied to one or to both sides of the cationically-charged membrane to achieve a symmetrical or asymmetrical composite membrane. In a preferred embodiment the reaction comprises irradiating the composition present on the cationically-charged membrane with electron beam or ultraviolet irradiation.

Typically the cationically-charged membrane (i.e. the untreated membrane) comprises a front side and a back side and only one of the front side and backside is reacted with the composition or both the front side and the back side are reacted with the composition.

The untreated membrane and/or the surface-treated membrane may be subjected to a corona discharge treatment, plasma glow discharge treatment, flame treatment, ultraviolet light irradiation treatment, chemical treatment or the like, e.g. for the purpose of improving its wettability and the adhesiveness.

The support, when present, may also be treated to modify its surface energy, e.g. to values above 45 mN/m, preferably above 55 mN/m.

Thus in a preferred aspect of the present invention the composition further comprises an inert solvent (c) and the weight ratio of the total amount of components (a) and (b) to the inert solvent is at least 0.10, more preferably at least 0.12, especially 0.15 to 1.

In a preferred embodiment the composition further comprises (c) an inert solvent and:
(i) the weight ratio of the total amount of components (a) and (b) to component (c) is at least 0.10; and
(ii) component (a) forms a salt with a polyvalent counter ion wherein the molar ratio of the counter ion to component (a) is from 0.1 to 0.6.

In a further preferred embodiment the composition comprises:
(a) from 8 to 80 parts of monofunctional ethylenically unsaturated monomer(s) forming a salt with a polyvalent counter ion wherein the molar ratio of the counter ion to the monofunctional ethylenically unsaturated monomer(s) (a) is from 0.1 to 0.6; and
(b) from 0 to 5 parts of crosslinking agent(s) comprising two or more ethylenically unsaturated groups
(c) from 20 to 90 parts of inert solvent(s); and
(d) from 0 to 5 parts of photoinitiator(s).

Preferably the molar ratio of (b):(a) is lower than 0.04 or is zero and/or the weight ratio of the total amount of components (a) and (b) to component (c) is at least 0.10.

Preferably the composite membranes of the invention are obtained by a process comprising reacting a cationically-charged membrane with a composition comprising:
(a) a monofunctional ethylenically unsaturated monomer having an anionic charge; and
(b) a crosslinking agent comprising two or more ethylenically unsaturated groups; preferably wherein the molar ratio of (b):(a) is lower than 0.04 or is zero.

Preferably the composition is as defined and preferred as described in the first aspect of the present invention.

The process of the present invention may contain further steps if desired, for example washing and/or drying the resultant composite membrane.

When the composite membrane is washed, the amount of anionic groups derived from component (a) and present on the membrane after washing is to some extent determined by the properties of the cationically-charged membrane to which the composition was applied, especially by the amount of remaining reactive (i.e. ethylenically unsaturated) groups present in the cationically-charged membrane which are capable of reacting with the composition. Also the extent of swelling of the cationically-charged membrane may also affect the remaining amount of anionic groups derived from component (a) present on the membrane. The amount of remaining reactive groups present on the cationically-charged membrane to which the composition was applied and the extent of swelling can be controlled by the choice of composition used in the process of the present invention and by the curing conditions used for the preparation of the cationically-charged membrane (i.e. the untreated membrane). For example, by reducing the relative amount of crosslinking monomer or by reducing the radiation dose in the curing step used to make the cationically-charged membrane (i.e. the untreated membrane) the extent of swelling increases which may result in a higher penetration of the composition into the cationically-charged membrane. When the radiation dose is decreased it is likely that the relative number of reactive groups remaining after curing increases. These modifications applied to the cationically-charged membrane have an influence on the amount of ionic groups derived from component (a) and present on the membrane after washing and may be used to fine-tune the properties of the resultant composite membrane. Further the composition itself and the amount applied to the cationically-charged membrane (i.e. the untreated membrane) may be tuned to prepare a composite membrane having the desired properties.

Preferably the process further comprises the step of washing unreacted composition from the composite membrane. Our experiments indicated that a large proportion of the composition does not react with the cationically-charged membrane and is removed in such a washing step. This procedure makes the coating process much easier since no strict metering is required and allows a large variation of coating techniques to prepare the composite membrane. Following this observation, we found that particularly good results could be achieved when the composition is concentrated, i.e. contains large proportion of component (a) and (b) when present.

While it is possible to prepare the composite membrane of the present invention on a batch basis using a stationary, untreated membrane, it is much preferred to prepare the composite membrane on a continuous basis using a moving untreated membrane. The untreated membrane may be in the form of a roll which is unwound continuously or the untreated membrane may rest on a continuously driven belt (or a combination of these methods). Using such techniques the composition can be applied to the untreated membrane on a continuous basis or it can be applied on a large batch basis.

The curable composition may be applied to the untreated membrane by any suitable method, for example by curtain coating, blade coating, air-knife coating, knife-over-roll coating, slide coating, nip roll coating, forward roll coating, reverse roll coating, micro-roll coating, dip coating, foulard coating, kiss coating, rod bar coating or spray coating. The curable composition typically forms a continuous film layer on the cationically charged membrane. The coating of multiple layers can be done simultaneously or consecutively. When coating multiple layers, the curable compositions may be the same or different.

Thus the application step may be performed more than once, either with or without curing being performed between each application. When applied to different sides the resultant composite membrane may be symmetrical or asymmetrical.

Thus in a preferred process, the composition is applied continuously to a moving untreated membrane, preferably by means of a manufacturing unit comprising one or more composition application station(s), one or more irradiation source(s) for curing the composition, a composite membrane collecting station and a means for moving the untreated membrane from the curable composition application station(s) to the irradiation source(s) and to the membrane collecting station.

The composition application station(s) may be located at an upstream position relative to the irradiation source(s) and the irradiation source(s) is/are located at an upstream position relative to the membrane collecting station.

In order to produce a sufficiently flowable composition for application by a high speed coating machine, it is preferred that the composition has a viscosity below 5000 mPa·s when measured at 35° C., more preferably from 1 to 1500 mPa·s when measured at 35° C. Most preferably the viscosity of the composition is from 2 to 500 mPa·s when measured at 35° C. For coating methods such as slide bead coating the preferred viscosity is from 2 to 150 mPa·s when measured at 35° C.

With suitable coating techniques, the composition may be applied to a moving untreated membrane at a speed of over 1 m/min, e.g. 5 m/min, preferably over 10 m/min, more preferably over 15 m/min, e.g. more than 20 m/min, or even higher speeds, such as 60 m/min, 120 m/min or up to 400 m/min can be reached.

Reaction of the untreated membrane and the composition is preferably performed by radical polymerisation, preferably using electromagnetic radiation. The source of radiation may be any source which provides the wavelength and intensity of radiation necessary to cure the composition. A typical example of a UV light source for curing is a D-bulb with an output of 600 Watts/inch (240 W/cm) as supplied by Fusion UV Systems. Alternatives are the V-bulb and the H-bulb from the same supplier.

When no photoinitiator is included in the composition, the composition can be cured by electron-beam exposure, e.g. using an exposure of 50 to 300 keV. Reaction can also be achieved by plasma or corona exposure.

During reaction components (a) and (b) (when present) typically polymerise to form a very thin layer of oppositely charged material on the cationically-charged membrane. Also it is possible that no visibly distinct layer is formed but that the surface of the cationically-charged membrane is modified (e.g. 'surface-modified') by the reaction with the composition. The reaction (or curing) may be brought about by any suitable means, e.g. by irradiation and/or heating. Preferably the reaction occurs sufficiently rapidly to form a composite membrane within 30 seconds. If desired further curing may be applied subsequently to finish off, although generally this is not necessary.

Preferably curing of the composition begins within 3 minutes, more preferably within 60 seconds, after the composition has been applied to the cationically-charged membrane.

Preferably the curing is achieved by irradiating the composition for less than 30 seconds, more preferably less than 10 seconds, especially less than 3 seconds, more especially less than 2 seconds. In a continuous process the irradiation occurs continuously and the speed at which the composition moves through the beam of irradiation is mainly what determines the time period of curing. The exposure time is determined by the irradiation time by the concentrated beam; stray 'light' generally is too weak to have a significant effect.

Preferably the curing uses ultraviolet light. Suitable wavelengths are for instance UV-A (390 to 320 nm), UV-B (320 to 280 nm), UV-C (280 to 200 nm) and UV-V (445 to 395 nm), provided the wavelength matches with the absorbing wavelength of any photoinitiator included in the curable composition.

Suitable sources of ultraviolet light are mercury arc lamps, carbon arc lamps, low pressure mercury lamps, medium pressure mercury lamps, high pressure mercury lamps, swirlflow plasma arc lamps, metal halide lamps, xenon lamps, tungsten lamps, halogen lamps, lasers and ultraviolet light emitting diodes. Particularly preferred are ultraviolet light emitting lamps of the medium or high pressure mercury vapour type. In most cases lamps with emission maxima between 200 and 450 nm are particularly suitable.

The energy output of the irradiation source is preferably from 20 to 1000 W/cm, preferably from 40 to 500 W/cm but may be higher or lower as long as the desired exposure dose can be realized. The exposure intensity is one of the parameters that can be used to control the extent of curing which influences the final structure of the membrane. Preferably the exposure dose is at least 40 mJ/cm$^2$, more preferably between 40 and 1500 mJ/cm$^2$, most preferably between 70 and 900 mJ/cm$^2$ as measured using a High Energy UV Radiometer (UV PowerMap™ from EIT, Inc) in the UV-A and UV-B range indicated by the apparatus.

To reach the desired exposure dose at high coating speeds, more than one UV lamp may be used, so that the curable composition is irradiated more than once.

Photoinitiators may be included in the curable composition, as mentioned above, and are usually required when curing uses UV or visible light radiation.

According to a third aspect of the present invention there is provided use of a composite membrane according to the first aspect of the present invention for water purification, especially for the removal of nitrate ions from water.

Although the membranes of the present invention are primarily intended for use in water purification (e.g. by electrodeionisation or electrodialysis, including continuous electrodeionisation (CEDI) and electrodialysis reversal (EDR)), they may also be used for other purposes requiring membranes having ionic groups, e.g. capacitive deionisation used in e.g. flow through capacitors (FTC), Donnan or diffusion dialysis (DD) for e.g. fluoride removal or the recovery of acids, pervaporation for dehydration of organic solvents, fuel cells, electrolysis (EL) of water or for chlor-alkali production, and reverse electrodialysis (RED).

According to a fourth aspect of the present invention there is provided an electrodialysis or reverse electrodialysis unit, an electrodeionization module, a flow through capacitor, a diffusion dialysis apparatus, a membrane distillation module or a membrane electrode assembly, comprising one or more membranes according to the first aspect of the present invention. The electrodeionization module is preferably a continuous electrodeionization module.

Preferably the electrodialysis or reverse electrodialysis unit or the electrodeionization module or the flow through capacitor comprises at least one anode, at least one cathode and two or more membranes according to the first aspect of the present invention.

In a preferred embodiment the unit comprises at least 1, more preferably at least 5, e.g. 36, 64, 200, 600 or up to 1500, membrane pairs according to the first aspect of the present invention, the number of membranes being dependent on the application. The membrane may for instance be used in a plate-and-frame or stacked-disk configuration or in a spiral-wound design.

A suitable method to assess the presence of anionic groups is a zeta-potential measurement. When the untreated membrane is positively charged (i.e. cationic) and the monofunctional ethylenically unsaturated monomer has a negative charge (i.e. anionic) the resultant composite membrane preferably has a zeta potential lower than −8 mV, more preferably lower than −10 mV. The zeta potential may be measured using an Anton Paar SurPASS Electrokinetic Analyzer as illustrated in the Examples.

The extent to which the composite membrane comprises a surface charge opposite to the charge of the underlying membrane (i.e. a negative charge) may be expressed as the 'effective charge' of the composite membrane. The resultant composite membrane can be washed if desired by a cation.

In our experiments a very low effective charge appeared to be very effective to achieve a good monovalent selectivity without significantly increasing the electrical resistance of the composite membrane for monovalent ions. A high electrical resistance for monovalent ions would cause a high stack resistance and a low limiting current density because the overall ion transport rate is reduced. The resultant composite membrane preferably has an effective charge of lower than 10 μmol/m$^2$, especially lower than 5 μmol/m$^2$. The effective charge may be measured using inductively coupled plasma optical emission spectrometry ("ICP-OES"), e.g. by using a Perkin-Elmer 5300DV ICP-OES, as illustrated in the Examples.

The limiting current density, monovalent ion selectivity and ion removal efficiency of the composite membrane may be measured by the methods described below in the Examples. The resultant composite membrane preferably has a limiting current density ("LCD") of at least 18 A/m$^2$, more preferably at least 20 A/m$^2$. The LCD may be measured by the method described below in the Examples.

The present invention provides composite membranes having a good selectivity for monovalent ions over multivalent ions. Such selectivity may be expressed in terms of the composite membrane's transport number for nitrate ions relative to sulphate ions ($P_{SO4}^{NO3}$). Preferably the composite membrane has a $P_{SO4}^{NO3}$ of at least 2, more preferably at least 3. The transport number may be determined by the method described below in the Examples.

Furthermore, the composite membrane preferably has a nitrate removal efficiency of at least 40%, more preferably at least 50%. The nitrate removal efficiency may be measured by the method described below in the Examples.

Membranes of the prior art often have a large electrical resistance which contributes to a high stack resistance of the electrodialysis device. Preferably the composite membranes of the present invention are such that the electrical resistance of a model stack containing 10 cell pairs of composite membranes according to the present invention of area 10×10 cm$^2$ is lower than 200 ohm, more preferably lower than 150 ohm, especially lower than 100 ohm.

The composite membranes of the invention are particularly useful for the removal of nitrate ions from water.

The invention will now be illustrated with non-limiting Examples where all parts and percentages are by weight unless specified otherwise.

In the Examples the following properties were measured by the methods described below.

Measurement of Effective Charge by ICP-OES

The effective charge of the membranes under test was measured as follows. The tests were performed four times on each membrane and the results provided below are the average of four measurements:

Each membrane under test was cut to provide four circular samples of membrane, each having a diameter of 7.0 cm and a surface area of 38.5 cm$^2$ on each side. The four samples were then subjected to a number of washing procedures using water (WW), an NaCl solution (NW) then a KCl solution (KW) as follows:

1. Water washing procedure (WW)—the four samples were each placed in a cup containing pure water (100 cm$^3$) and were gently stirred overnight at a speed of 120 rpm. The samples were then removed from the water and washed with pure, flowing water.
2. NaCl washing procedure (NW)—the four samples were each placed in a cup containing NaCl solution (100 cm$^3$, 0.5M NaCl) and then gently stirred overnight at a speed of 120 rpm. The samples were then removed from the solution and washed with pure, flowing water.
3. KCl washing procedure (KW)—the four samples were each placed in a clean tube of volume 50 cm$^3$, filled with KCl solution (10 cm$^3$, 0.5M KCl, 99.999% trace metals basis ex Sigma Aldrich) and then gently stirred overnight at a speed of 120 rpm. The samples were then removed from the solution. The KCl washes were analysed as described below.

The washing procedure used, in order, was WW, NW, NW, WW, WW and KW.

The KCl washes were each diluted 50 times in 1% nitric acid

Each diluted, KCl wash was then analysed using a Perkin-Elmer 5300DV ICP-OES device employing a cross-flow nebulizer in conjunction with a Scott spray chamber. The amount of sodium (Na) was determined using the 588.995 and 589.592 nm atomic emission lines and constitutes the amount that is washed from the membrane by 0.5M KCl. This amount corresponds to the 'effective charge'.

Yttrium was used as an internal standard to all diluted KCl solutions to a concentration of 0.10 mg/l. The Yttrium spectral line 371.029 nm was used.

A Calibration curve was set up in the range from 0-10 mg/l using 6 standards. (0.00, 0.10, 0.50, 1.00, 5.00, 10.00). Standards were diluted from the ICP multi element standard IV from Merck KGaA. This standard contained the elements Ag; Al; B; Ba; Bi; Ca; Cd; Co; Cr; Cu; Fe; Ga; In; K; Li; Mg; Mn; Na; Ni; Pb; Sr; Tl and Zn, each in concentration of 1000 mg/l.

A spike recovery test was performed and all spectral lines were checked for matrix interferences.

Analysis was performed twice and the average figure was used. The settings on the Perkin-Elmer 5300DV ICP-OES device can be summarized as follows:

| Plasma settings: | plasma | 15 l/min |
|---|---|---|
| | auxiliary | 0.20 l/min |
| | nebulizer | 0.70 l/min |
| | power | 1350 Watt |
| | view | Axial |
| | view dist | 15.0 mm |
| Process of data: | peak algorithm | multicomponent spectral fitting |
| | point per peak | 3 |
| Pump parameters | sample flow rate | 1.50 ml/min |
| Wash parameters | frequency | between samples |
| | location | 0 |
| | solution | 0.1% HNO3 |
| | rate | 1.50 ml/min |
| | time | 75 s |
| Spike recovery test addition | | 0.25 mg/l |

The effective charge is expressed as µmol elementary charges per m$^2$ of membrane surface and can be converted to the actual charge using the Faraday constant (1 µmol/m$^2$ corresponds to 0.0965 Coulomb/m$^2$).

Measurement of Zeta Potential

The Zeta potential measurements were performed three times on each sample and the results quoted below represent the average of the three results.

Samples of the membrane under test were stored in KCl solution (1 mM, pH=5, adjusted using 0.05M HCl) for at least one night before measuring their zeta potential.

The zeta potential measurements were performed using an Anton Paar SurPASS Electrokinetic Analyzer with software Attract 2.0 using the following settings:
Cell: Adjustable Gap Cell
Sample size: 20×10 mm
Type: single measurement
Parameter settings for automated measurement:
Preparation: Rinse
Rinse Target Pressure/mbar: 300
Time Limit/s: 900
Ramp Target Pressure/mbar: 400
Max. Ramp Time/s: 20
Measure: Streaming Current
Electrolyte: KCl solution (1 mM, pH=5 in milli-Q ultra-pure water)

After filling each cell it was rinsed for about 10 min. At the end of the rinse period the gap height was adjusted to 100±2 µm. A Flow Check was performed at 400 mbar and the measurement was started.

A cleaning procedure was performed after each measurement.

Measurement of ER in an Electrodialysis Stack ("Stack ER")

A model electrodialysis stack was prepared comprising the composite anion exchange membranes under test, alternatingly with commercially available cation exchange membranes (CMX membranes bought from Astom) with spacers therebetween of thickness 0.27 mm to provide a total of 22 compartments alternating, 10 of which were diluate and 10 of which were concentrate compartments and two of which were used as electrode compartments. Each membrane had an effective area of 36 cm$^2$. The electrode compartments at the top and bottom of the stack comprised mixed metal oxide mesh electrodes mounted on titanium plates. The stack was compressed between plastic endplates and fixed with bolts. The flow channels through the stack were kept open by the spacers of rectangle shape (41 mm width and 89 mm length) including netting (woven PET fibres having a diameter of 150 µm). The stack comprised two inlets on one side and two outlets on the other side.

A test feed solution was made by dissolving NaCl (3300 mg), Na$_2$SO$_4$ (1480 mg) and NaNO$_3$ (1370 mg) in 10 litre of pure water. The test feed solution was fed into both the diluate and concentrate compartments of the stack. An electrode solution was made by dissolving K$_3$[Fe(CN)$_6$]

(16.5 g) and $K_4[Fe(CN)_6]\cdot3H_2O$ (21.1 g) in one litre of pure water and this electrode solution was circulated through the electrode compartments.

The test feed solution was fed into the stack through the inlets of the diluate and concentrate compartments at a flow rate of 250 cm³/min (corresponding to a linear flow velocity of 4.6 cm/s) and the solutions exiting the diluate and concentrate compartments were collected separately.

The ER of the model stack was measured by recording the voltage V for a constant current of 0.11 A about 1 minute after starting the measurement.

The stack ER was calculated by performing the calculation:

$$ER=[V]/[0.11]$$

Measurement of Limiting Current Density (LCD)

The LCD was measured by the method described by N. Káňavová et al. in Chemical Papers 68 (3) 324-329 (2014), using the relationship between the current and the corresponding potential. As LCD was taken the point on the current-voltage curve where the slope changed from the ohmic region to the limiting current region due to water dissociation.

Measurement of Nitrate Removal Rate

The nitrate removal rate was measured using the abovementioned model electrodialysis stack as follows: a fixed current of 0.11 A was applied continuously across the model stack as the abovementioned test feed solutions were passed through both the diluate and concentrate compartments of the stack. Samples of the solutions exiting the diluate and concentrate compartments were collected separately at 10, 15 and 20 minutes after the start. All the samples including reference samples (i.e. untreated feed solution) were analysed by ion chromatography to quantify the concentration of nitrate ($NO_3^-$), sulphate ($SO_4^{2-}$) and chloride ($Cl^-$) ions present. The ion chromatography system was an ICS5000 (Dionex) with AG19 guard column and AS19 analytical column (Dionex), and the detection was done by conductivity. A KOH gradient solution prepared with an eluent generator was used for the separation. The nitrate removal rate was calculated based on the comparison with the untreated feed solution by calculating the concentration decrease in the diluate compartment and the concentration increase in the concentrate compartment as follows.

For the diluate samples:

[100%−(Analysed $NO_3^-$ concentration in treated diluate)/($NO_3^-$ concentration in untreated feed solution)].

For the concentrate samples:

[(Analysed $NO_3^-$ concentration in treated concentrate)/($NO_3^-$ concentration in untreated feed solution)−100%].

All 6 values (at 10, 15, 20 minutes for both diluate and concentrate samples) were calculated and averaged.

Measurement of Selectivity $P_{SO_4}^{NO_3}$

The selectivity P nitrate/sulphate was measured using the abovementioned model stack. Sulphate removal rates were calculated by the same method as used for the nitrate removal rate for the measured sulphate concentrations. The selectivity was calculated by [nitrate removal rate]/[sulphate removal rate].

The following ingredients were used to prepare the composite membranes:

| | |
|---|---|
| MBA | is N,N'-methylene bisacrylamide from Sigma Aldrich. |
| AMPS | is 2-Acryloylamido-2-methylpropanesulfonic acid from Hang-Zhou (China). |
| CEA | is 2-Carboxyethyl acrylate from Sigma Aldrich. |
| DABCO | is 1,4-diazabicyclo[2.2.2]octane (triethylenediamine) from Sigma Aldrich. |
| DMAPAA-Q | is a 75 wt % aqueous solution of 3-acrylamidopropyl-trimethylammonium chloride from Kohjin. |
| Darocur™ | 1173 is 2-hydroxy-2-methyl-1-phenyl-propan-1-one, a photoinitiator from BASF Resins, Paint & Coatings. |
| MeHQ | is hydroquinone monomethyl ether, a polymerisation inhibitor from Merck. |
| IPA | is 2-propanol from Shell (an inert organic solvent). |
| LiNO₃ | is lithium nitrate from Sigma Aldrich. |
| LiOH•H₂O | is lithium hydroxide monohydrate from Chemetall. |
| NaOH | is sodium hydroxide from Sigma Aldrich. |
| Viledon® | Novatexx 2223-10 is a nonwoven polyolefine porous support from Freudenberg Filtration Technologies. |
| Viledon® | Novatexx 2226-14E is a nonwoven polyolefine porous substrate from Freudenberg Filtration Technologies. |
| PW | is pure water (an inert solvent). |
| Surfactant | is a polyether siloxane from Evonik. |

Preparation of Untreated Membrane 1 ("UM1")

A composition containing the ingredients indicated in Table 1 wherein all amounts are in wt % relative to the total weight of the composition, was applied by hand to an aluminium underground carrier using a 150 μm wire wound bar, at a speed of approximately 5 m/min, followed by application of a Viledon® Novatexx 2223-10 non-woven support. Excess composition was scraped-off using a wire bar (Standard K bar No. 0 with 0.05 mm diameter wire, by RK Print Coat Instruments Ltd) and the impregnated support was cured by irradiation with UV light (D-bulb) with a dose of 0.43 J/cm² at one side and subsequently with 0.43 J/cm² on the other side.

TABLE 1

Preparation of Untreated membranes

| ingredient | Wt % |
|---|---|
| DMAPAA-Q | 53.20 |
| MBA | 9.90 |
| water | 7.00 |
| IPA | 8.40 |
| Darocur™ 1173 | 0.50 |
| MEHQ | 0.05 |
| LiNO₃ | 19.95 |
| Surfactant | 1.00 |

Preparation of Untreated Membrane 2 ("UM2")

The method described for UM1 was repeated except that the said UV dose was 0.21 J/cm² instead of 0.43 J/cm².

Preparation of Untreated Membrane 3 ("UM3")

The method described for UM1 was repeated except that in place of Viledon® Novatexx 2223-10 there was used Viledon® Novatexx 2226-14E and the UV lamp was operated at a dose of 0.58 J/cm².

The resultant membranes UM1 to UM3 were stored in a sealed bag at room temperature.

Preparation of Compositions for Reaction with the Unmodified Membranes

Compositions were prepared by mixing the ingredients indicated in Table 2 below:

TABLE 2

| | Compositions | | | | |
|---|---|---|---|---|---|
| ingredient | Comp. A | Comp. B | Comp. C | Comp. D | Comp. E |
| AMPS | 40.0 | 15.0 | 0 | 5.0 | 40.0 |
| DABCO | 0 | 4.0 | 0 | 0 | 0 |
| CEA | 0 | 0 | 21.5 | 0 | 0 |
| MBA | 0 | 0 | 0 | 2.0 | 1.6 |
| Water* | 54.6 | 80.1 | 73.1 | 81.1 | 53.0 |
| IPA | 0 | 0 | 0 | 10.0 | 0 |
| LiOH•H₂O | 4.5 | 0 | 0 | 1.0 | 4.5 |
| NaOH | 0 | 0 | 4.5 | 0 | 0 |
| Darocur ™ 1173 | 0.5 | 0.5 | 0.5 | 0.5 | 0.5 |
| Surfactant | 0.4 | 0.4 | 0.4 | 0.4 | 0.4 |

*0.01 wt % of inhibitor (4-hydroxy-2,2,6,6-tetramethylpiperidin-1-oxyl) was included in the water.

Preparation of Composite Membranes

The compositions indicated in Table 3 below were applied to one side of the indicated unmodified membranes by kiss coating followed by removal of excess composition to provide a wet thickness of 24 µm using a wire bar (Standard K bar No. 3 with 0.31 mm diameter wire, by RK Print Coat Instruments Ltd). The compositions were irradiated using UV (H-bulb, 0.4 J/cm²), and then dried at 140° C. for 10 seconds in an oven.

The resultant membranes were then washed by soaking in 0.5M NaCl at 25° C. for one night to remove unreacted composition and washed with pure water before each evaluation.

The resultant membranes were as shown in Table 3 below.

CEx3 and CEx4 are untreated membranes (i.e. no composition was applied to them) and are included as reference.

TABLE 3

| | Composite Membranes | |
|---|---|---|
| Example | Untreated Membrane | Composition |
| 1 | UM1 | A |
| 2 | UM1 | B |
| 3 | UM1 | C |
| 4 | UM2 | A |
| 5 | UM3 | A |
| Cex1 | UM1 | D |
| Cex2 | UM1 | E |
| Cex3 | UM1 | — |
| Cex4 | UM3 | — |

The membranes described in Table 3 above were tested using the abovementioned test protocols and the results are shown in Table 4:

TABLE 4

| | Test Results | | | | | |
|---|---|---|---|---|---|---|
| Example | Zeta Potential (mV) | Effective charge (µmol/m²) | LCD (A/m²) | Nitrate removal rate (%) | Selectivity $P_{SO_4}^{NO_3}$ | Stack ER (ohm) |
| 1 | −13 | 1.9 | 27 | 53 | 4.4 | 82 |
| 2 | −15 | <1.4 | 35 | 54 | 3.6 | 43 |
| 3 | −20 | <1.4 | 28 | 51 | 4.0 | 76 |
| 4 | −14 | 4.2 | 20 | 41 | 3.0 | 174 |
| 5 | −10 | 7.0 | 25 | 48 | 3.4 | 81 |
| Cex1 | −12 | 7635 | 3 | 21 | 2.3 | 182 |
| Cex2 | −10 | 21254 | 12 | 35 | 1.4 | 129 |
| Cex3# | 2 | — | 41 | 40 | 0.8 | 42 |
| Cex4# | 4 | — | 40 | 40 | 0.8 | 45 | means not a composite membrane.

Comparative examples CEx3 and CEx4 had a positive zeta-potential indicating that no negative charge was present on their surface. The effective charge was not measured as it was expected that no charge would be detected.

EXAMPLES 6 TO 10

In a second series of experiments the compositions A, B and C indicated in Table 3 above were applied to both sides of the unmodified membranes indicated in Table 3 by dip coating. Excess composition was removed to provide a wet thickness of 24 µm by leading the coated membrane between two wire bars (Standard K bar No. 3 with 0.31 mm diameter wire, by RK Print Coat Instruments Ltd). The composition on both sides of the membrane were irradiated simultaneously using UV (H-bulb, 0.4 J/cm²), and then dried at 140° C. for 10 seconds in an oven.

The resultant membranes were then washed by soaking in 0.5M NaCl at 25° C. for one night to remove any unreacted composition and the resultant membrane was then washed with pure water before each evaluation.

The properties of the resultant membranes (which had been coated on both sides) showed no significant differences compared to the single side coated equivalents from Examples 1 to 5 above and provided similar results to those described in Table 4 except that the values of the effective charge were twice that of the corresponding single-side coated membranes from Examples 1 to 5.

The invention claimed is:

1. A composite ion exchange membrane comprising a cationically-charged membrane and an oppositely charged compound covalently bound thereto, the composite ion exchange membrane having:
    (i) a zeta-potential lower than −8 mV; and
    (ii) an effective charge lower than 20 µmol/m².

2. The composite membrane according to claim 1 wherein the oppositely charged compound comprises a sulpho group.

3. The composite membrane according to claim 1 wherein the cationically-charged membrane further comprises a porous support.

4. The composite membrane according to claim 1 having an effective charge of less than 10 mol/m².

5. The composite membrane according to claim 1 having:
    (i) a zeta-potential lower than −10 mV; and
    (ii) an effective charge lower than 10 µmol/m².

6. The composite membrane according to claim 1 wherein only one side of the cationically-charged membrane has an oppositely charged compound covalently bound thereto.

7. The composite membrane according to claim 1 wherein both sides of the cationically-charged membrane have an oppositely charged compound covalently bound thereto.

8. A membrane stack comprising two or more composite membranes according to claim 1.

9. The composite membrane according to claim 1 wherein the cationically-charged membrane has been obtained by a process comprising the polymerisation of a composition comprising a crosslinking agent and a monofunctional ethylenically unsaturated monomer having a cationic charge.

10. The composite membrane according to claim 1 wherein the zeta-potential is lower than −10 mV and the effective charge is lower than 5 $\mu mol/m^2$.

11. The composite membrane according to claim 1 wherein the zeta-potential is measured using an Anton Paar SurPASS Electrokinetic Analyzer using 1 mM KCl solution at pH 5 in milli-Q ultrapure water as electrolyte.

12. The composite membrane according to claim 1 wherein the effective charge constitutes the amount of sodium ions washed from the composite membrane surface by 0.5M KCl after an overnight washing with 0.5M NaCl.

13. A membrane stack comprising two or more composite membranes according to claim 2.

* * * * *